Patented May 1, 1928.

1,668,308

UNITED STATES PATENT OFFICE.

CHARLES EBERT, OF LEONIA, NEW JERSEY; WILLIAM B. NEWKIRK, OF RIVERSIDE, ILLINOIS; AND MEYER MOSKOWITZ, OF SPRING VALLEY, NEW YORK, ASSIGNORS TO INTERNATIONAL PATENTS DEVELOPMENT COMPANY, OF WILMINGTON, DELAWARE, A CORPORATION OF DELAWARE.

METHOD OF MAKING DEXTROSE.

No Drawing.   Application filed April 29, 1927. Serial No. 187,699.

Our invention relates to the manufacture of solid dextrose, either as naturally formed crystals, in which case the product may be of a purity closely approximating 100%, or in the form of slabs or blocks, to be subsequently comminuted and dried, ordinarily in which case, the product will be of a lower purity, the actual dextrose content depending upon the purity of the converted liquor and the extent to which the hydrol or mother liquor is eliminated from the slab by pressing or other method of extraction.

The principal object of this invention is to provide a novel and improved method whereby the purity, or available dextrose content of the converted liquor is increased so as to increase the yield of dextrose from a given amount of starch, facilitate the crystallization, in case a high purity product is to be manufactured, and make it possible to manufacture slab sugars of substantially the maximum purity now produced without pressing the slabs to extract hydrol, or to make a higher purity sugar of this type by extraction of some of the hydrol from the slabs.

In carrying out the process, a mixture of starch and water at the usual density for conversion, for example, at a density from 13° to 20° Baumé is converted either in the usual copper converter with the customary amount of hydrolyzing acid, hydrochloric acid, for example, or, preferably, for the reasons that will be stated, in a glass enamel-lined converter the interior surfaces of which are catalytically inert in the conversion reactions. The conversion is preferably carried out substantially as far as possible, that is so as to give as high a dextrose content as is obtainable under the circumstances. For example when copper converters are used, the highest dextrose content ordinarily obtainable is in the neighborhood of 89 to 90 per cent, on the basis of dry substances, although this percentage may vary to some extent in different factories. The conversion may be carried out under a pressure of from 40 to 45 pounds per square inch. Any suitable hydrolyzing acid may be used, for example, a commercial 28 per cent hydrochloric acid in the proportion of 90 pounds of the acid to 2500 gallons of starch liquor.

When the conversion is completed, the converted liquor is neutralized with sodium carbonate or other suitable neutralizing agent, according to the method used for making the conversion. This produces coagulation and precipitation of protein, fat and colloidal impurities and a partial precipitation of mineral salts, that is of the salts of iron, copper and other metals resulting from contact of the starch and converted liquor with metals during different stages of the porcess. The neutralization is carried out sufficiently to give the liquor, preferably, a hydrogen ion concentration of pH=4.5 to 4.8, the higher pH being preferable.

If the conversion is performed in a glass enamel-lined converter instead of the usual copper converter, the conversion will take place free from he catalytic influence of the copper walls of the converting vessel and of the copper salts resulting from reaction of the hydrolyzing acid with the converter walls. Consequently, the dextrose content of the liquor may be higher than indicated since, for the reasons to be stated, these substances tend to catalyze or polymerize the dextrose as formed into a non-crystallizable sugar or sugars of higher molecular weight.

The neutralized dextrose solution is then given a mechanical filtration to remove the coagulated and precipitated impurities.

It is then subjected to another acid hydrolysis conversion, the acidity being substantially the same as that of the first conversion. In this second conversion, it is particularly important that this conversion should be carried out in a converter having an enamel lining or other interior surface which is catalytically inert in the sense above mentioned. The neutralization of the liquid from the first conversion removes from the solution a considerable quantity at least of the impurities produced by action of the hydrolizing acid on the non-starch substances in the starch, that is the proteins, fats and cellulosic substances, and also some, at least, of the mineral salts. These impurities if allowed to remain in the solution act, apparently as catalysts to bring about, under the conditions which prevail in the converting operation, a condensation or polymerization of the dextrose, as formed, into polysaccharides which are not crystallizable themselves and furthermore prevent a certain amount of dextrose from crystallizing when the solution is supersaturated. With these substances removed and the second conversion carried out in such a manner, for example in a glass enamel-lined converter, as to prevent the formation of additional metallic impurities that will catalyze the dextrose, not only will no more dextrose be converted to the higher molecular forms, but a certain amount of these polysaccharides already produced by the first conversion will be hydrolyzed by the action of the acid and the heat and reconverted to the monosaccharide. With the ordinary dextrose conversion carried to the stage customary for the manufacture of solid grape sugar, either the crystalline or the slab sugars, all of the starch will usually be converted into dextrose. Some of this dextrose, approximately 10 or 11 per cent thereof, has however been changed into polysaccharide sugar or sugars. That is for a grape sugar conversion, the conversion of the starch to sugar is ordinarily complete. No starch and practically no dextrine or other products intermediate starch and dextrose remain in the solution. The reason why the dextrose content cannot be increased is that the conversion has, necessarily, to be carried too far. To convert all of the starch some of the dextrose is changed into the higher sugars. However by reconverting the polysaccharides back to dextrose in a second conversion performed in the absence of the catalysts affecting the dextrose in the manner as above described, a converted liquor can be obtained having a considerably higher dextrose content than is procurable by one conversion under any known method, at least under any known method feasible for manufacture on a commercial scale. By referring to the second conversion as carried on in the absence of catalysts affecting the dextrose we do not mean that there may not be small amounts of such catalysts either remaining in the solution or produced by the conversion. The important point is that their presence should be so diminished that the reverse reaction of polysaccharide to monosaccharide should predominate.

The liquor from the second conversion is neutralized, preferably to the same pH as the liquor from the first conversion. It is mechanically filtered to remove any impurities coagulated and precipitated during the neutralization step and is preferably then evaporated to about 30° Baumé and given an adsorption treatment, preferably by filtering over bone black. The liquor is then concentrated to whatever crystallizing gravity is required for the product for which the liquor is to be used.

For example, the liquor may be crystallized in a crystallizer in accordance with the methods of Patent No. 1,471,347 to Newkirk, Oct. 23, 1923, and Patent No. 1,521,830 to Newkirk, Jan. 6, 1925; or, if the purity of the liquor is sufficiently high, it may be crystallized as the anhydride by a graining operation in the pan in accordance with Newkirk application Serial No. 167,362, filed Feb. 10, 1927.

One of the advantages of our invention, however, is that it becomes possible to manufacture a slab sugar product of substantially the maximum dextrose content heretofore obtainable, without however pressing the slabs to extract mother liquor or hydrol as has been customary; or if a sugar of this type is desired but with a higher purity, it is possible to obtain the same by subjecting the slabs to the usual pressing in hydraulic presses.

The slab sugar product now on the market which has the highest purity is "Argo sugar", the dextrose content of which is approximately 94 to 96 per cent dry basis. A grape sugar of this character can be made by casting the converted liquor, obtained as above described, on the casting floor or in molds, after the liquir has been concentrated to the usual density, and after the material has solidified by crystallization, crushing, drying and screening the sugar without pressing any hydrol out of the slabs. If a higher purity is desired, the slab sugar may be pressed to extract some of its hydrol.

Realizing that modifications may be made in the details of the process, we desire to be understood as intending to cover by patent all variations of methods within the scope of the appended claims.

We claim:

1. Method of making dextrose which comprises subjecting starch to an acid hydrolysis conversion carried substantially as far as possible, neutralizing the converted liquor until coagulation and precipitation of impurities takes place, filtering the same, and then subjecting it to another acid hydrolysis conversion and neutralizing and filtering the resultant liquor.

2. Method of making dextrose which comprises subjecting starch to an acid hydrolysis conversion carried far enough to yield a liquor containing approximately 89 per cent or higher of dextrose on a dry substance basis, neutralizing the converted liquor until coagulation and precipitation of impurities takes place, filtering the same, and then subjecting it to another acid hydrolysis conversion and neutralizing and filtering the resultant liquor.

3. Method of making dextrose which comprises subjecting starch to an acid hydrolysis conversion carried substantially as far as possible, neutralizing the converted liquor until coagulation and precipitation of impurities takes place, filtering the same, and then subjecting it to another acid hydrolysis conversion in a converting vessel, the interior surfaces of which are catalytically inert in the conversion reactions and neutralizing and filtering the resultant liquor.

4. Method of making dextrose which comprises subjecting starch to an acid hydrolysis conversion carried substantially as far as possible, neutralizing the converted liquor until coagulation and precipitation of impurities takes place, filtering the same, and then subjecting it to another acid hydrolysis conversion in the absence of substances tending to catalyze dextrose to polysaccharides, and neutralizing and filtering the resultant liquor.

5. Method of making dextrose which comprises subjecting starch to an acid hydrolysis conversion carried far enough to yield a liquor containing approximately 89 per cent or higher of dextrose on a dry substance basis, neutralizing the converted liquor until coagulation and precipitation of impurities takes place, filtering the same, and then subjecting it to another acid hydrolysis conversion in a converting vessel, the interior surfaces of which are catalytically inert in the conversion reactions and neutralizing and filtering the resultant liquor.

6. Method of making dextrose which comprises subjecting starch to an acid hydrolysis conversion in which substantially all of the starch is converted to sugar, removing from the solution substances tending to catalyze the dextrose to polysaccharides and then reconverting the liquor in the presence of an acid.

7. Method of making dextrose which comprises subjecting starch to an acid hydrolysis conversion in which substantially all of the starch is converted to sugar, removing from the solution substances tending to catalyze the dextrose to polysaccharides and then reconverting the liquor in the presence of an acid, and in a vessel, the interior surfaces of which are catalytically inert in the conversion reactions.

8. Method of making dextrose which comprises subjecting starch to an acid hydrolysis conversion carried substantially as far as possible, neutralizing the converted liquor until coagulation and precipitation of impurities takes place, filtering the same, and then subjecting it to another acid hydrolysis conversion and neutralizing and filtering the resultant liquor, both conversions being carried out in vessels having interior surfaces which are catalytically inert in the conversion reactions.

9. Method of making dextrose which comprises subjecting starch to an acid hydrolysis conversion carried substantially as far as possible, removing from the converted liquor substances tending to catalyze dextrose to polysaccharides, and then subjecting the liquor to another acid hydrolysis conversion to reconvert the polysaccharides to the monosaccharides.

10. Method of making dextrose which comprises subjecting the starch to an acid hydrolysis conversion carried substantially as far as possible, neutralizing the converted liquor until coagulation and precipitation of impurities takes place, filtering the same, subjecting the liquor to another acid hydrolysis conversion, neutralizing and filtering the resultant liquor and evaporating the same to approximately 30° Baumé, then giving the liquor a carbon filtration and evaporating it to a crystallizing density and bringing about crystallization of the dextrose.

11. Method of making dextrose which comprises converting starch in the presence of an acid, neutralizing the converted liquor until coagulation and precipitation of impurities takes place, filtering the same, reconverting the purified liquor, neutralizing, filtering and concentrating the reconverted liquor to a crystallizing density, allowing the liquor to solidify and comminuting the solidified sugar without extraction of hydrol.

12. Method of making dextrose which comprises converting starch in the presence of an acid, neutralizing and filtering the converted liquor, reconverting the purified liquor in a vessel, the interior surfaces of which are catalytically inert in the conversion reactions, neutralizing and filtering the reconverted liquor, concentrating the same to a crystallizing density, allowing the liquor to solidify and comminuting the solidified sugar, without extraction of hydrol.

13. Method of making dextrose which comprises converting starch in the presence of an acid until all of the starch is changed into sugars, removing from the converted solution substances tending to catalyze the dextrose to polysaccharides, reconverting the liquor in a converter, the interior surfaces of which are catalytically inert in the conversion reactions, removing impurities from the reconverted liquor and concentrating the liquor to a crystallizing density, then allowing the liquor to solidify and comminuting the solidified sugar without extraction of hydrol.

CHARLES EBERT.
WILLIAM B. NEWKIRK.
MEYER MOSKOWITZ.